United States Patent [19]

Roy

[11] 3,967,266

[45] June 29, 1976

[54] DISPLAY APPARATUS HAVING IMPROVED CURSOR ENHANCEMENT

[75] Inventor: Jean Claude Roy, Sunnyvale, Calif.

[73] Assignee: Hewlett-Packard Company, Palo Alto, Calif.

[22] Filed: Sept. 16, 1974

[21] Appl. No.: 506,389

[52] U.S. Cl. .......................... 340/324 AD; 178/30

[51] Int. Cl.$^2$ ........................................ G06F 3/14

[58] Field of Search ................ 340/324 AD; 178/30; 235/198

[56] References Cited

UNITED STATES PATENTS

| | | | |
|---|---|---|---|
| 3,418,518 | 12/1968 | Reese, Jr. | 340/324 AD |
| 3,444,319 | 5/1969 | Artzt et al. | 340/324 AD |
| 3,531,796 | 9/1970 | Kiesling | 340/324 AD |

*Primary Examiner*—Marshall M. Curtis
*Attorney, Agent, or Firm*—A. C. Smith; Theodore S. Park

[57] ABSTRACT

A non-interlaced raster-type display includes interface circuitry for displaying character patterns indicative of data signals manipulated by a processor under the control of a manually-operable keyboard. The displayed character patterns are enhanced by half-shifting or delaying a raster line of display signals for a given character in order to improve the legibility of displayed alphanumeric character patterns. A blinking pointer or cursor is manually movable via keyboard control to the character spaces desired and the blinking cursor display is inhibited during movement thereof in order to maintain an invariant display of the cursor during repositioning.

5 Claims, 3 Drawing Figures

DISPLAY APPARATUS HAVING IMPROVED CURSOR ENHANCEMENT

BACKGROUND AND SUMMARY OF THE INVENTION

Certain known computer terminals use a conventional TV-type raster for displaying the data from a processor which operates under the control of a manual keyboard. In terminals of this type the displayed character patterns are formed as the composite of illuminated dots or spots along interlaced scan lines through a row of character spaces. TV-type computer displays are reported in the literature (see, for example, U.S. Pat. No. 3,345,458 issued on Oct. 3, 1967 to D. A. Cole, et al.).

It is desirable to maintain high density of displayed characters on a cathode-ray-type display tube and still maintain legible character patterns, for example, alphanumeric characters. Also, it is desirable to provide a pointer or cursor which can be manually positioned within the display of character patterns and which can be readily viewed within a dense field of displayed characters. Accordingly, the present invention provides a non-interlaced scanned display of character patterns in character spaces, which character patterns may be enhanced in order to improve the shape and legibility, for example, of alphanumeric characters thus displayed. Further, the present invention provides a blinking displayed cursor which is manually positionable in the display field and which, when being repositioned, remains continuously visible to avoid the apparent effect of "galloping" from one position to the next while momentarily not visible.

DESCRIPTION OF THE DRAWINGS

FIG. 1 comprising

DESCRIPTION OF THE PREFERRED EMBODIMENT

Figure 1A:
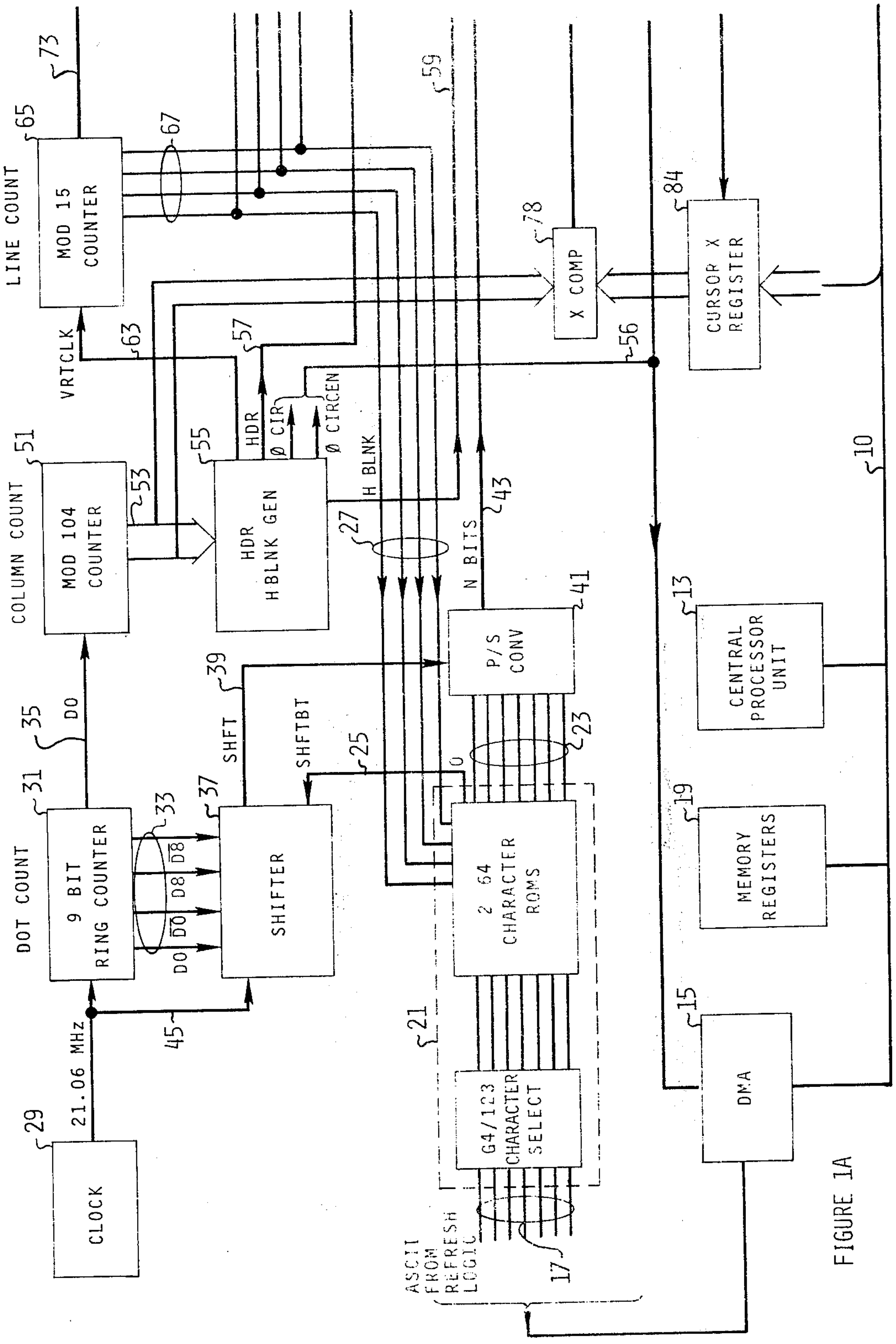
FIGS. 1A and 1B is a simplified schematic diagram of the display apparatus of the present invention.
Figure 1B:
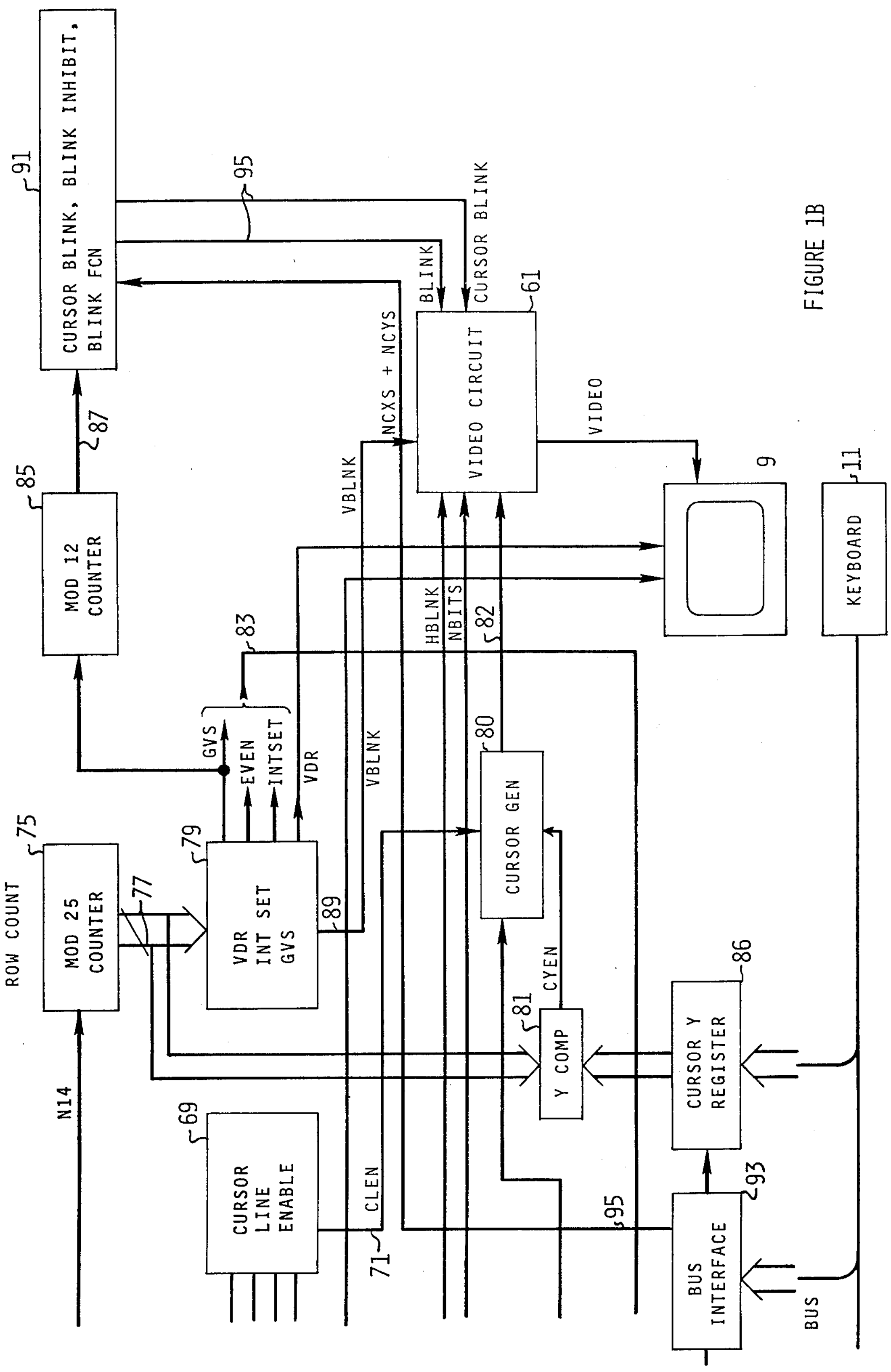

FIG. 1 is a simplified schematic diagram of the circuitry used to produce visual displays of data signals on a display device such as a cathode ray display screen 9. The screen is associated with a keyboard 11 in a terminal console for operation on the bus 10 with a central processor unit 13 and the memory registers 19. A substantial portion of the memory apparatus for the central processor unit 13 is included within DMA block 15 wherein a plurality of memory registers may be directly addressed for use by the central processing unit 13 in generating the characters to be displayed. The display screen 9, keyboard 11, central processor unit 13, and DMA 15 and memory registers 19 thus described are conventional in nature and form no part of the present invention separately from the following description.

Figure 2:
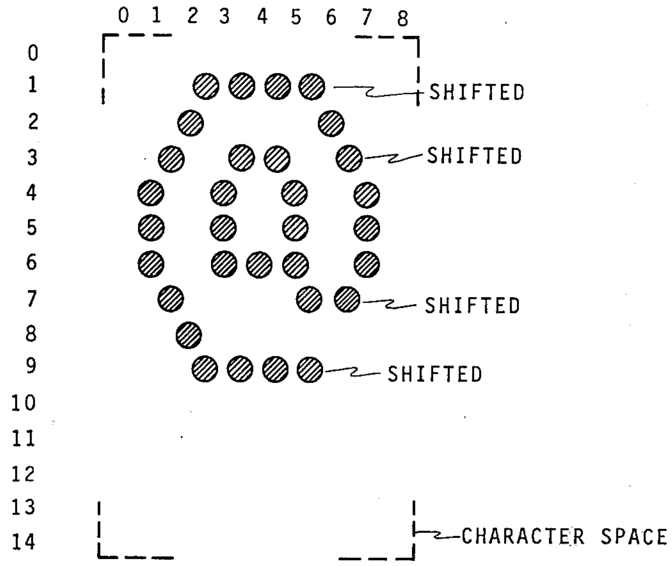
FIG. 2 is a pictorial representation of an enhanced alphanumeric character in accordance with the present invention.

The DMA 15 produces a plurality of signals on signal lines 17 which are referred to as conventional ASCII-standard signals. The ASCII signals identifying characters to be displayed and appearing on lines 17 are applied to a matrix converter circuit 21 which produces a series of discrete logic level signals on selected ones of the output lines 23 and on the shift bit output line 25 in synchronism with signals applied to the matrix converter on lines 27. The synchronizing signals on lines 27 are produced from oscillator 29 that operates as a crystal-controlled clock or reference frequency, say, at a frequency of 21.06 MHz. This reference frequency determines the number of frames or pages of information displayed per second on the cathode ray display screen 9, as well as the number of lines or rows of data per displayed page, and the number of characters per row, as well as the number of scan lines per row. This reference frequency is divided down by a nine-bit counter 31 to produce signals on output lines 33 which are indicative of nine display dots per display character and also produces a divided output signal of 2.34 MHz on line 35. The output signals from counter 31 on lines 33 and the reference frequency from oscillator 29 are applied to shifter 37 which includes conventional logic gate circuitry that produces a shift control output on line 39 for half-cycle shifting the positions of each of 9 dot positions represented by the outputs 33 from counter 31 in response to appearance of a shift bit on input line 25. The signals appearing in parallel on lines 23 and the shift control output on line 39 are applied to a parallel-to-serial converter 41 which thus operates in a commutating fashion to provide a serial stream of logic level signals for a single line at a time of dots to be displayed on the cathode ray display screen 9. Each of these dots may be in a position corresponding to a count state determined by counter 31, or in an alternate half-shifted position from same, as determined by the shift bit input on line 25. This increased resolution capability provides for improved alphanumeric character formation, as shown in FIG. 2.

The output of the dot counter 31 is applied to the modulo-104 column counter 51 which counts the divided 2.34 MHz signal appearing on line 35. This counter 51 thus produces on output lines 53 encoded representations of 104 discrete operating states of the counter 51, which operating states correspond to each of 104 distinct character spaces along a row of data. Only the first 80 of such discrete operating states are used to display data while the remaining 24 operating states are representative of off-screen logic conditions, such as beam-retrace time, datafetching times, etc. These 104 discrete operating states are applied to the horizontal drive logic block 55 which produces therefrom the analog converted equivalent of the digital states for deflection of a cathode ray beam in the display tube 9 and for producing an output indication of the completion of one full scan line of data, which output indication is returned to the DMA 15 along line 56. The signal returned to the DMA 15 from horizontal drive circuitry 55 provides an indication that one full scan line of the horizontal sweep has been completed. This signal prepares the DMA 15 to retrieve the next line of information to be displayed. In addition, the horizontal drive circuitry 55 produces a horizontal blanking signal on line 59 which is applied to the video logic circuitry 61 for blanking the display screen at the end of each scan line and during retrace of the beam to its initial line position in preparation for the display of a new scan line. In addition, the horizontal drive circuitry 55 also produces an output signal on line 63 once for each 104 operating states encoded on lines 53 for application to the modulo-15 counter 65. This counter 65 provides encoded signals on output lines 67 which indicate each of 15 discrete logic operating states of the counter 65. These output signals thus indicate each of the 15 scan lines required to produce one row of display characters and are applied to the matrix converter 21 for the purpose of synchronizing the production of logic level signals on lines 23. The output signals from the modulo-15 counter 65 are also applied to the cursor line enable circuit 69 for producing a cursor line enable signal on line 71 in response to the appearance of a preselected scan line identification code, say, scan line 11 or 12, from the signals appearing on line 67. Thus, the input frequency of 22.5 KHz applied to modulo-15 counter 65 is divided down to a signal of 1.5 KHz which is applied on line 73 to modulo-25 counter 75. This counter 75 produces signals on output lines 77 which identify 25 discrete operating states of the counter 75, 24 of which operating states identify the rows of character spaces required to display a complete page of data on cathode ray display screen 9. The 25th of these operating states is the period of time required to complete the vertical retrace back to the top of the display screen. These output signals on line 77 are applied to the vertical drive circuitry 79 and are also applied to the Y cursor comparator 81, later described. The vertical drive circuitry 79 gates out vertical synchronizing signals on lines 83 which are applied back to the DMA 15 in order to identify completion of a full row of data and completion of the number of rows of displayed data which form the complete page of displayed data. An output signal once per 25 counts of the counter 75 is applied to counter 85 for producing sufficiently low-frequency output signals for controlling the blinking rate of a cursor on the cathode ray display screen 9 and for controlling the blinking rate of any selected character. In addition, the vertical drive circuitry 79 also produces a vertical blanking signal on line 89 which is applied to the video logic circuit 61 at the conclusion of each completed count of character rows, as determined by counter 75, in order to blank the retrace of the cathode ray beam during the 25th operating state of counter 75.

The cursor control circuitry 91 receives the low-frequency signal appearing on line 87 and the signal from the bus interface circuit 93 for controlling blinking operation of a cursor which is movable about the field of display on the cathode ray display screen 9, and for inhibiting the blinking of the cursor during movement of the cursor about the display field. The signals produced by the cursor control circuitry 91 and appearing on lines 95 are applied to the video logic circuitry 61 for controlling the display on the display screen 9. This video logic circuitry merely combines the applied signals to provide the requisite signals including horizontal blanking, vertical blanking and video signals for operating the cathode ray display screen 9 to display the data.

In operation, the data to be displayed derived from central processor unit 13 controls the DMA unit 15 to access the requisite memory registers 19 to produce encoded signals on lines 17 that represent the alphanumeric characters, or other appropriately displayable characters, which are required to display the output from the central processor unit 13. Each of the signal combinations appearing on the seven lines 17 represents a specific one of possible 128 different displayable characters that are retained in the matrix converter 21 for conversion to bit patterns on lines 23 and on the shift bit line 25. Thus, upon the calling out for display of a letter such as lower case *a*, the central processor unit 13 controls the DMA unit 15 to produce the requisite code signals on lines 17, which signals are then converted by the matrix converter 21 to bit patterns on selected ones of lines 23 and 25. These bit patterns are converted by the parallel-to-serial converter 41 to a series of logic level signals on line 43 that appear in synchronism with each of the logic level states of the counter 31. The logic signals on line 43 thus appear for each of the scan lines through a character space and thereby produce requisite illuminated spots on the display screen 9 at the appropriate ones of each of the nine locations in a character space per scan line. Upon conversion and encoding of a shift bit on line 25, the shifter circuitry 37 selects the alternate half cycle of the reference clock 29, applied to the shifter circuitry 37 via line 45, in order to shift in time the dot patterns on the display screen 9 within the character space along the scan line currently being produced, as shown in FIG. 2. One entire scan line for the entire row of data to be displayed is produced as a series of logic level signals on line 43, shifted or unshifted per character space, in the manner thus described. At the end of one complete scan line, each of the remaining scan lines 2–15 is produced in substantially the same manner until the entire 15 scan lines per row of data to be displayed are produced.

Upon the occurrence of 104 character space counts, the vertical clock signal on line 63 indicates the conclusion of one complete scan line through all the character spaces in a row. The next operating state of counter 65 is indicated by the signals appearing on lines 67 which, as applied to the matrix converter 21, initiate the appearance of new bit patterns on the output lines 23. These new bit patterns on lines 23 are thus converted to serial logic levels appearing on line 43 for application to the display screen 9 for each of the scan lines through the rows of character spaces to be displayed. At a selected vertical location, say at scan line 11 or 12, in a row of character spaces to be displayed, the operating state of counter 65 is indicated by the output signals on line 67, which operating state is sensed by the cursor line enable circuitry 69. This specific scan line identifying code is detected by the cursor line enable circuitry 69 to produce a cursor control signal on line 82 if the conditions for establishing a cursor as determined by the cursor X register 84 and the cursor Y register 86 are satisfied. Thus, the cursor generator so produces the cursor control signal on line 82 in response to the appearance of a signal from the X comparator 78 indicating that the selected column is being formed or scanned and upon appearance of a signal from the Y comparator 81 indicating the selected row is being formed or scanned and upon appearance of the signal on line 71 indicating that the preselected scan line within the row is being formed. The cursor X register 84 may include digital circuitry, for example, such as an accumulator which is under the direct control of keyboard 11 for manually selecting the column in which the cursor is to appear. Similarly, the cursor Y register may include digital circuitry, for example, such as an accumulator, which is under direct control of the keyboard 11 for selecting the particular row in which a cursor is to appear. Upon the appearance of parity between the signals applied respectively to the X comparator 78 and the Y comparator 81 the output signals from these comparators are applied to the cursor generator 80 for displaying a cursor in the selected character space.

When a cursor is selected to be displayed, via manual operation of the keyboard, the bus interface circuitry 93 detects this signal condition on the bus 10 and activates the cursor registers 84 and 86 to receive the cursor position coordinate information directly from the keyboard 11 and bus 10. In addition, when the coordinate information in the cursor register 84 or 86 is being changed, the bus interface 93 detects the changed condition and produces a blink blanking signal on line 95 for application to the cursor control circuit 91. This inhibits the blinking cursor signal on line 95 applied to the video logic circuit 61 in order to maintain a steadily displayed cursor during the period of change of the coordinate information in the cursor register 84 or 86. The cursor therefore appears not to "gallop" by disappearing from one location (i.e. blinking) and reappearing in another location.

I claim:

1. Apparatus for displaying character patterns on a display device as recurring signals within character spaces, and comprising:

character pattern generating means for producing recurring signals for application to a display device to provide indications thereon of selected character patterns;

circuit means for applying signals to a display device to produce a cursor which is selectably positionable with respect to the character spaces including means for visibly blinking said cursor; and means coupled to the circuit means and responsive to variations in time in the position of the cursor for disabling said blinking means to display a non-blinking cursor during movement of the cursor through a displayed character pattern.

2. Apparatus as in claim 1 wherein said circuit means includes register means for providing signals indicative of the coordinates of a selected position of the cursor; and said means is responsive to change in a signal from a register means for inhibiting the blinking of the cursor.

3. Apparatus as in claim 2 wherein said generating means includes source means of reference frequency and divider means coupled to said source means and to said circuit means for providing an oscillatory signal to control the rate of blinking of the cursor.

4. Apparatus as in claim 3 wherein said divider means of said generating means provides horizontal and vertical sweep signals for application to a display device to provide said indications thereon of selected character pattern.

5. Apparatus according to claim 3 wherein said divider means also provides an output indication of the number of recurrences of signals applied to a display device for producing a row of character patterns; and said means is responsive to the output indication from said divider means attaining a preselected value for producing said blinking indication of a cursor during said preselected number of recurrences of signal applied to the display device.

* * * * *